Patented Apr. 7, 1936

2,036,466

UNITED STATES PATENT OFFICE 2,036,466

METHOD FOR MAKING SYNTHETIC PRODUCTS

George H. Ellis, St. Paul, Minn., assignor to The Insulite Company, Minneapolis, Minn., a corporation of Minnesota No Drawing. Application June 21, 1930, Serial No. 462,940

3 Claims. (Cl. 18—47.5)

This invention relates to methods for the production of water-proof heat insulating bodies, and to those bodies per se as articles of manufacture. Among the objects are: to provide methods for quickly compressing any synthetic material which is composed of "woody" substances mixed, or combined with, a meltable filler, or mixed with a meltable and partly volatilizable material; to produce such bodies which are tough and strong; to produce tough and strong waterproof bodies by incorporating asphalt with cellulosic or other suitable material; and to obtain products having the qualities mentioned by submitting the filler-containing and/or asphalt-containing material to heat and pressure. Other objects are to provide methods for producing materials which have great tensile strength; which are substantially water-proof or which will absorb a relatively small quantity of water as compared with known artificially produced bodies which contain woody material; and to produce materials which have very small linear expansion in the presence of moisture.

The term "woody" as used herein means vegetable material which contains any or all of the constituents ordinarily found in trees and plants; and the roots, bark and leaves of the same.

Features and advantages of the invention are set forth herebelow.

The invention is partly based on the discovery that "woody" material mixed with a meltable, or with a partly volatile water-proof filling material can be made into a very hard, tough, waterproof body of high tensile strength and of very low moisture expansible quality, by the method of compacting such a mass, by heat and pressure, and by first raising the material to a temperature which will convert at least a part of the filling material to a mobile condition or partly volatile condition, or which will volatilize or make mobile part of the filler and woody material and set up an internal vapor pressure within the mass, which is releasable by removal of part of the vapor when extraneous pressure is applied to the mass. The invention is also partly based upon the discovery that the above results can be accomplished by applying extraneous pressures, and varying the pressures to compact the material, including in most instances, the holding of the pressure for a predetermined length of time after each pressure change, and including at least one pressure variation which allows entry of air to the surface against which the pressure is applied. The invention is also partly based on the discovery of the action of asphalt in general and of high melting asphalt in particular, when operated upon by the methods herein set forth.

A suitable material, such as cellulosic or "woody" material, is fiberized by mechanical means using any of the usual devices now employed for producing wood pulp. It is desirable to produce a pulp having a long coarse fiber, and good results are obtained by the use of raw wood, as distinguished from chemically treated pulp. A very satisfactory substance for the purpose herein is obtained by introducing into the pulp either as an emulsion, or in the form of a dry ground powder, asphalt, preferably a high melting point asphalt. This asphalt is thoroughly mixed. Good results have been obtained by using amounts of asphalt varying substantially from two to fifteen per cent of the weight of the finished product.

Dry or powdered asphalt with comparatively high melting point is desirable herein to obtain the best results. In order that asphalt can be powdered at ordinary temperatures it should have a melting point above 200° F. That is the melting point must not be so high that flowing under heat and pressure is prevented, nor so high that such a temperature will have to be applied as will scorch or burn the wood, or cellulosic material, before the asphalt can be melted and thoroughly flowed, and distributed to obtain proper bonding of the material with which it is associated.

If liquid (low melting point) asphalt is mixed with pulp the batch is sticky and adheres to screens and pipes. With liquid asphalt a stiff board cannot be produced because the asphalt is always soft and pliable at ordinary temperatures. Another great advantage in using asphalt for the purposes herein is that it has a negligible co-efficient of expansion, in relation to moisture.

The following example illustrates one method of carrying out the invention, and further illustrates one of the best procedures thus far discovered: We will suppose: that the press temperature is raised to 370° F. and is maintained at this temperature substantially throughout the operation; that the maximum press pressure is to be 600 lbs. per square inch; and that the theoretical fluid pressure produced within the material by the meltable and/or volatilizable portions thereof is 160 lbs. per square inch. After raising the press to the proper temperature, the press pressure is raised from zero to 600 lbs. per square inch. The press is then held at this higher pressure, say for five minutes (the length of this holding period may be varied). The pressure is then decreased to a point below that of the calculated fluid pressure, say to 100 lbs. per square inch, at which pressure it is held for say one minute (this holding period may be varied). During this holding period some fluid (liquid or vapor and/or gas) is pressure-released. It is to be noted that when the press pressure has been reduced, in this instance by 500 lbs. and is, therefore, only 100 lbs., it is less by 60 lbs. than the theoretical fluid pressure (160 lbs.) within the material, and, therefore, the mass is vented under the driving force of 60 lbs. pressure. This venting results in making the mass more compressible, due to ejection or release of a portion of the fluid content. To continue: The press pressure is again increased to substantially 600 lbs. and is again held at this pressure for about five minutes. Then the pressure is again reduced to about 100 lbs., held at this pressure for one minute, again raised to 600 lbs., held at that pressure for five minutes, then again lowered to 100 lbs., held for one minute and then again raised to 600 lbs. and held for five minutes. It will be understood that a greater or lesser number of pressure changes may be employed. Then the pressure is again reduced, but at this time to zero, and there results a sufficient release of residual fluidic content to prevent subsequent blistering in the finished product. Moreover, oxygen is introduced to contact the hot impregnated body, and raises the melting point of the filler (in this case asphalt), and, therefore, hardens it, and probably hardens some of the other "woody" substances of the pressed mass, which are at or near the surface of the board or slab. The time at which the press is held at this zero pressure may be varied, but is ordinarily about one minute. Then pressure is again raised to the maximum, and held for about five minutes, after which the pressure is again released to zero and the product is finished.

This process, as carried out with the above number of pressure variations, takes about 37 to 39 minutes to complete. In practice, it takes about one minute to raise the press pressure from zero to 600 and about an equal time to reduce the pressure to 100 and so on. The press pressure is also held at zero, for venting purposes, for about a minute.

One of the objects, of course, is to obtain as great a difference between the relief (vapor) pressure over the reduced press pressure as possible, so that the release of fluid (vapor or liquid) and therefore release of fluid pressure is speeded up, thus correspondingly speeding up the process as a whole.

A modification by which the process can be speeded up over that of the first method consists in applying a press pressure and a temperature which sets up in the material a vapor pressure which is greater than the maximum press pressure to be employed, so that during the pressing operation, the vapor pressure in the board is greater than the applied press pressure, and pressure-release is, therefore, taking place during the time of application of press pressure. When the press pressure is dropped to zero (after application of the greatest press pressure) a quick relief of a substantial portion of the residue fluid pressure is obtained. After expulsion of the fluid or gaseous residues, due to this zero drop, maximum press pressure is, as in the original case, again applied to re-compress after residue release.

The following procedure is an example. The temperature of the press is first raised to 450° F. At this temperature, the calculated fluid or vapor pressure is 485 lbs. A press pressure of 450 lbs. is now applied, and application is continued for 15 minutes. Pressure is then reduced to zero and held at this figure for one minute, to obtain a quick venting of any pressure residue and to admit air. The pressure is then raised to 450 pounds, and held at this pressure for five minutes, and is then again reduced to zero, at which time the product is finished. The product has substantially the same tensile strength, water absorptive quality and degree of expansion per lineal foot, as the product produced under the first mentioned procedure. By this method, the operations are completed in about 25 minutes.

The difference between tensile strength, water absorption ability, and degree of expansion when submitted to action of moisture, of products made by the old method and those made by the present method, are striking. For example, using the old method with a press temperature of 370° F. and a maximum press pressure of 600 lbs. per square inch, the product has a tensile strength of about 2500 lbs. per square inch of area, a water absorption of five per cent in two hours (under water) and an expansion under water in this same length of time of approximately .006 of an inch per lineal foot. Under the same conditions and using one of the herein described methods, the tensile strength is about 4000 lbs. per square inch of area, water absorption is one and one-half per cent in two hours (under water), and the expansion has varied from zero to .001 of an inch per lineal foot. It can, therefore, be seen that the method herein results in a speedy production of a very hard product which has comparatively high tensile strength, low expansion when submitted to the action of moisture, and very low water absorptive qualities.

It is desirable, and the process is so carried out, that the maximum temperature be such that no charring will take place, but sufficiently high to obtain proper flow and/or vaporization of the mobile constituents of the material. The best maximum operative temperatures so far appear to be within the range of 350° to 400° F.

At 300° F., an asphalt which melts at 170° F. has a viscosity of 318; at 350° F. it has a viscosity of 169; and at 400° F. it has a viscosity of 64. It, therefore, appears that the rate of change in viscosity is comparatively slow up to a certain point, and then the rate of change from that point is proportionately very much greater. It would appear, therefore, that the best temperatures for the carrying out of the present invention, when asphalt is used as a binder or filler, are within the range of from 350° to 400° F. That is, at temperatures at which no charring of the "woody" material will take place during the given time of application of extraneous pressures, but sufficiently high to obtain proper flow and partial volatilization of the binder material; all to the end that a satisfactory covering of the fiber by the asphalt is obtained. The existence of this satisfactory covering and inter-mixing is partly indicated by water, tensile and water expansion tests.

Heretofore it has been difficult to produce a board which had a uniform density and in which no blistering took place at the surface of the board upon release of the press pressure. The methods carried out herein result in the production of a board or body which not only does not blister, but which has an even surface and body texture with no surface blotching or discoloration, and a product which is hard, water-proof, of high tensile strength and substantially non-expansible when exposed to moisture. The present methods, including the use of pressure and heat, obtain release of a maximum amount of moisture from the mass being pressed. It is one of the important features that a very large proportion of moisture content can, by this process, be pressed out of the material, and thus a very dry and hard substance is produced. For the best results, the process should be carried out at a temperature above the vaporization and/or melting point of some of the substances contained in the mass, for example above the vaporization point of water, of certain wood gums; also above the vaporization point of about one-half of one per cent of the asphalt, which quantity is volatile at 350° F. and which seemingly acts as a flux, and which quantity it is one of the objects of the invention to release to permit the asphalt residue of lower volatility and/or meltability, to harden.

It is possible that under some conditions, depending on (1) asphalt content and quality; (2) amount of hydration of the fiber; (3) fineness of fiber, or degree to which the mass is capable of releasing moisture, the process will be modified. The fluid or vapor pressures are, of course, produced as the result of heat acting upon the meltable or volatile constituents of the mass being pressed. Where the fluid pressure is 55 lbs. per square inch, and where the press pressure is reduced to 20 lbs. the difference, or 35 lbs., will be the pressure under which the fluid is being ejected. This means that the pressure in the board is 35 lbs. per square inch greater than the reduced press pressure. Ejectment will be slower. If the fluid pressure is 160, and if press pressure is reduced to 100, there will have been a pressure reduction of 60 lbs. The venting pressure in the board, therefore, is 60 lbs. per square inch greater than the (reduced) press pressure.

Where the vapor pressure is 295 lbs. per square inch and the press pressure is reduced to 100, the difference, 195 lbs. per square inch, represents the pressure under which the fluid is being ejected. The greater the fluid pressure at its release period, the less time will be required for ejection of the excess fluid. Therefore, fluid release is quicker and fewer pressure changes are needed when the driving force in the mass is greater.

It has been found that, although the asphalt used in the process is soluble in gasoline, the product produced by these methods and containing asphalt is not soluble in gasoline, at least shows no evidence of solubility when immersed in it for twelve hours.

I claim as my invention:

1. A method for compacting by the simultaneous application of heat and pressure woody material which is loaded with high melting point asphalt, which consists in introducing the material into the press raising the press to and maintaining it at temperatures within the range of 370 degrees and 450 degrees Fahrenheit, to set up a predetermined calculated vapor pressure in the mass, applying press pressures ranging between 450 and 600 pounds per square inch, varying the degree of press pressure alternately above and below the calculated vapor pressure and after each variation holding the press at that pressure for periods ranging from one to fifteen minutes.

2. A method for making hard board by a simultaneous application of heat and pressure of woody material which is loaded with an asphalt binder which consists in introducing the material into a press, raising the press to and thereafter constantly maintaining it at a predetermined maximum temperature which is well above the melting point of the binder, raising press pressure to a predetermined maximum, then repeatedly alternately substantially decreasing the pressure below the maximum and increasing it to the maximum, maintaining the maximum pressure for a substantially greater length of time than the decreased pressure, and finally reducing the pressure to zero in a manner to let air reach those surfaces to which pressure is applied, the maintained temperature during pressing ranging from 370° to 450° Fahrenheit, and the pressures ranging from 450 to 600 pounds per square inch, and the pressure maintaining times ranging from a period of one to fifteen minutes.

3. A method for making hard board by a simultaneous application of heat and pressure of woody material which is loaded with an asphalt binder which consists in introducing the material into a press, raising the press to and thereafter constantly maintaining it at a predetermined maximum temperature, raising press pressure to a predetermined maximum, then repeatedly alternately substantially decreasing the pressure below the maximum and increasing it to the maximum, maintaining the maximum pressure for a substantially greater length of time than the decreased pressure, and finally reducing the pressure to zero in a manner to let air reach those surfaces to which pressure is applied, holding the press at zero for a predetermined time period, raising the pressure to the maximum, holding the pressure for a predetermined time and then reducing it to zero to complete the process, the maintained temperatures during pressing ranging from 370° to 450° Fahrenheit and the pressures ranging from 450 to 600 pounds per square inch, and the pressure maintaining time ranging from a period of one to fifteen minutes.

GEORGE H. ELLIS.